June 11, 1929.     K. M. KARLSSON     1,717,351
WEEDING KNIFE
Filed March 29, 1928
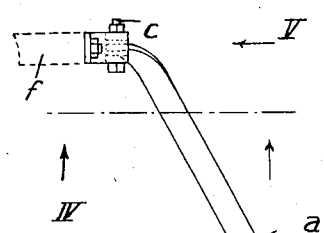
Fig.1.
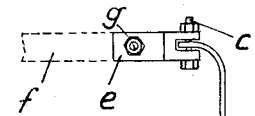
Fig.3.
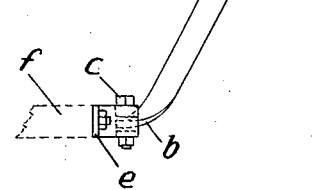
Fig.2.
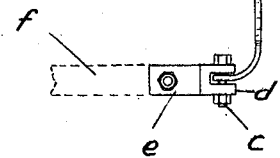
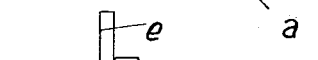
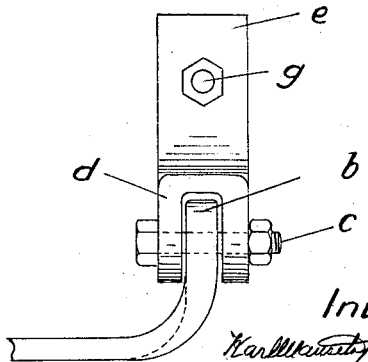
Fig.4.     Fig.5.
Inventor Patented June 11, 1929.

1,717,351

UNITED STATES PATENT OFFICE.

KARL MAURITZ KARLSSON, OF VADSBRO, SWEDEN.

WEEDING KNIFE.

Application filed March 29, 1928, Serial No. 265,799, and in Sweden September 29, 1926.

Plots of ground serving for the production of useful plants must often times, as is known, remain unused for one year or several years in order to become again able to produce said plants. While the ground lies fallow it becomes often times covered more or less densely with weeds which later on, when the ground is ploughed in order to be used again, are in most cases ploughed down, whereby, however, moist earth is exposed to the open air and valuable substances which could be useful for the growth of the plants volatilize. As the weeds sometimes grow somewhat quickly and the ground then becomes covered with them correspondingly quickly more or less densely it may become necessary to plough them down repeatedly in order to prevent them from becoming too dense. But every ploughing down entails the drawback mentioned.

The object of the present improved weeding knife is to remove the weeds without, however, exposing a material portion of the moist ground to the open air. This knife is shown diagrammatically and by way of example on the accompanying drawing on which Figure 1 is a plan of it, Figure 2 a sideview, Figure 3 a rear view and Figures 4 and 5 are details drawn to an enlarged scale relatively to said other figures, Fig. 4 being a section in the plane IV of Fig. 1, and Fig. 5 a section in the plane V of Fig. 1, both sections being viewed in the directions indicated by the arrows.

On the drawing, $a$ denotes the bent knife which forms an obtuse angle and is narrow in proportion to its length. The ends of the knife are curved and bent upwardly and form lugs $b$ having each a bore through which extends a bolt $c$. This is supported in a member $d$ having the shape of an inverted U and being provided with an upwardly extending lug $e$ also having a bore. The bores of the two lugs $e$ serve for attaching the weeding knife to any suitable agricultural vehicle by means of bolts $g$ and nuts, as shown. $f$ in Figs. 1-3 denotes parts of the respective vehicle.

From the apex of the angular knife $a$ extends upwardly an arm $h$, the upper end of which forms a downwardly directed hook $i$ which serves as grip. The knife can turn upon the bolts $c$ and can be lifted and lowered more or less, just as desired or required, by means of the grip $i$: that is to say, the depth in which the knife is to operate can be determined at will. Means may be combined with the arm $h$ for the purpose of maintaining it in the desired position. Such means may consist, for instance, of a sliding shoe or similar member sliding along upon the ground and being adjustably attached to the arm $h$ and, therefore, dragged by it. Withdrawing the knife from out of the ground is not impeded by said shoe etc., as it lies freely upon the surface of the ground and can, thus, be lifted at once.

The front edge of the knife $a$ is, of course, sharpened. The knife is inserted into the ground to a suitable depth in which it cuts through the roots of the weeds or destroys the latter in another manner. The upper parts of the weeds perish then and remain lying upon the surface where they may remain even through the winter as they not only not prevent the ground from sucking in the rainwater and snow-water, but also counter-act as effectively the drying-out of the ground and the penetration of coldness into it. Owing to this, that is to say, owing to the protection which the killed weeds have offered the ground, this latter is then by far more than otherwise able to nourish the fresh seed placed into it at the proper time.

I claim:

A weeding knife having the shape of an obtuse angle and being sharp at the inner edge of the angle, and having at its ends hinge members allowing of attaching it to any suitable agricultural vehicle, and a handle extending upwardly from the apex of said angle, substantially as set forth.

In testimony whereof I affix my signature.

KARL MAURITZ KARLSSON.